INVENTOR.
Robert G. Wilson
BY
ATTORNEY

INVENTOR.
Robert G. Wilson
BY
A H Oldham
ATTORNEY.

United States Patent Office 3,226,057
Patented Dec. 28, 1965

3,226,057
AUTOMATIC CONTROL SYSTEM FOR NAVIGATING A VEHICLE TOWARD AN ISOLATED REFERENCE POINT
Robert G. Wilson, 46 North Ave., Tallmadge, Ohio
Filed May 21, 1951, Ser. No. 227,511
10 Claims. (Cl. 244—14)

This invention relates to guiding vehicles, such as an aircraft, and is more particularly concerned with apparatus associated with the vehicle which will detect and "home" on an isolated target or reference point such as a ship at sea or the like and which will automatically guide the vehicle in the direction of the reference point.

It has been proposed heretofore, for example, in the patent application of Meneley and Langworthy, Serial No. 66,048, filed December 18, 1948, to provide guidance for a pilotless aircraft or the like by the automatic comparison, without human intelligence, of terrain information with stored reference information, and from the results of this comparison to generate automatically lateral and longitudinal error data with respect to a planned flight path, together with means for automatically employing the error data to correct the course of the aircraft. One limitation of such navigational apparatus is that it is restricted to operation over terrain that has considerable variation in detail that is fixed in position, from which detail a map comparison can be made. The system fails, however, when operating over a large body of water which is devoid of any landmarks or fixed reference points.

It is the general object of this invention to avoid and overcome the foregoing limitations in the prior art practice by the provision of mechanism for converting the apparatus disclosed and claimed in the aforesaid application to the operation and control of an automatically guided vehicle over a body of water or other terrain devoid of contrasting detail except an isolated reference point, such as a ship, buoy, or rock.

Another object of this invention is the provision of a variable density plate which can be substituted for the map of the terrain used in the apparatus of the above-identified application.

Another object of the invention is to provide an apparatus for maintaining a match between a radar image of the target and a point on the adapter plate.

Another object of the invention is the provision of relatively inexpensive, substantially foolproof, automatic apparatus for "homing" a moving vehicle or body on a reference point or target.

The foregoing objects of the invention, and other objects which will become apparent as the description proceeds, are achieved by providing a navigational apparatus for automatically guiding a vehicle to an isolated reference point, the apparatus including preferably radar means producing an image of the reference point on a radar screen for indicating the relative movement and position of the vehicle and reference point. A variable density plate is interposed between the radar screen and light sensitive means. Lens means, eccentrically mounted and moved relative to the plate, projects the radar image in a small rapid circular scanning movement on the face of the plate. Motor means associated with the plate and responsive to the variations in light falling on the light sensitive means move the plate in the plane of the plate relative to the image to bring them into substantial alignment. Alignment is characterized by uniform light falling on the light sensitive means during a complete circle of scan of the image on the plate. Means responsive to the position of the plate are coupled to the autopilot, or similar automatic vehicle control, to vary the course of the vehicle to guide the vehicle to the reference point.

For a better understanding of the invention, reference should be had to the accompanying drawings, wherein.

Figure 1:
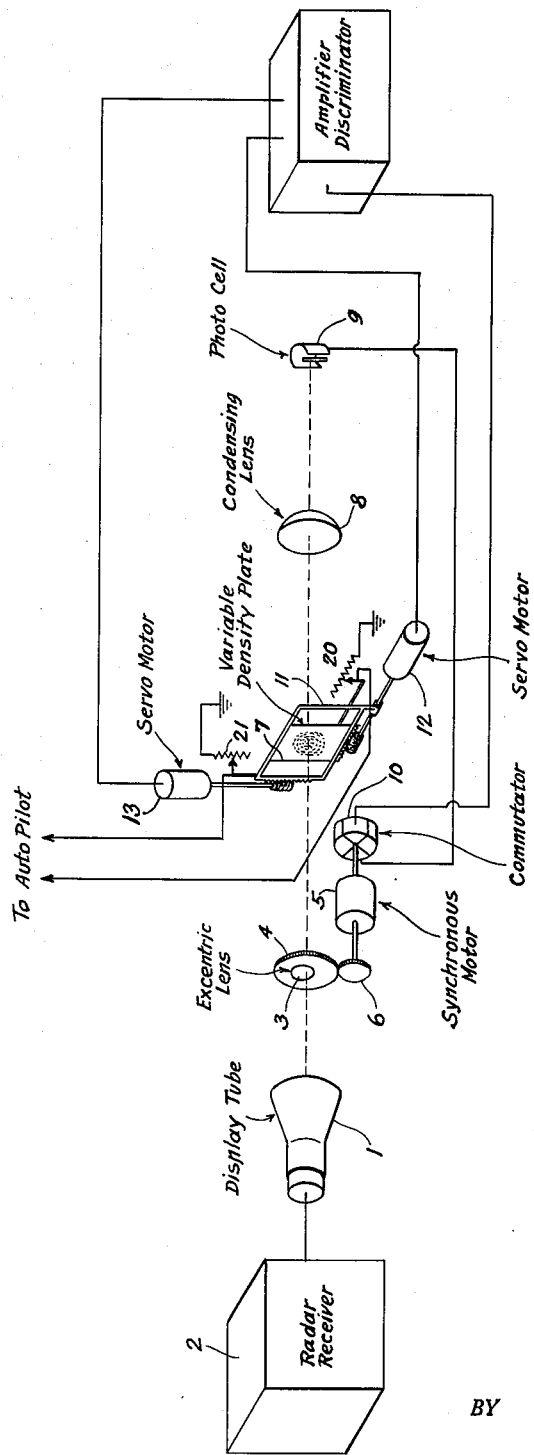
FIG. 1 is a diagrammatic perspective view of the mechanical-optical apparatus incorporating the essential features of the invention.

With specific reference to the form of the invention illustrated in the drawings, the numeral 1 indicates a display tube associated with a radar receiver 2. A bright spot is formed on the tube 1, which indicates the image of an isolated target, the position of the spot being determined by the relative position of the aircraft and target.

The target image is projected by means of a lens 3, which is eccentrically mounted in a gear 4 and rotated by a synchronous motor 5 through a meshing gear 6. Thus, it will be appreciated that, as the motor 5 revolves, the lens 3 will be moved eccentrically relative to the axis of the gear 4 so that the projected image of the target scans or nutates through a small circular path.

The projected target image, after passing through the lens 3, falls upon a variable density plate 7. The plate 7 has a light transmission characteristic which is preferably an increasing function of the distance from its center, that is, the plate is darkest at its center and gets lighter at its edges. However, the apparatus can function equally as well utilizing a plate which increases in optical density radially from a point of maximum light transmission. The density of the plate varies uniformly from the center of the plate radially in all directions. The light which passes through the variable density plate 7 is collected by a condensing lens system 8 and directed into a photocell or other light-sensitive means 9.

Associated with the motor 5 is a commutator 10 which is adapted to successively connect the output signal of the photocell 9 to each of the four segments of the commutator 10.

The variable density plate 7 is mounted on a frame 11 for lateral movement by a motor 12 mounted on the frame. The motor 12 moves the plate 7 by any suitable drive means such as a worm and worm rack as illustrated in FIG. 1. A similar motor 13 is associated with suitable mechanism for moving the frame 11 in a vertical direction.

It will be appreciated that if a single target such as ship appears on the display tube as a point of light and its projected image falls so that it describes a circle, under the action of the eccentric lens 3, that is exactly concentric with respect to the point of maximum density of the variable density plate 7, the output of the photocell 9 varies as the image scans the plate, the output being largest when the image is farthest from the center of the plate and dropping off as the image approaches the center. The commutator 10, being revolved synchronously with the eccentric lens-mounting gear 4, divides the output signal of the photocell 9 into four separate voltage signals corresponding to four quadrants of the scanning circle, hereinafter referred to as the "up-down" and "right-left" quadrants as determined by the directions of plate under movement of the motors 12 and 13. The commutator is phased with the scanning movement of the image such that when, for example, the projected image is in the "up" quadrant, the signal from the photocell 9 is brought out of the "up" segment of the commutator 10. It is evident that the difference in potential successively measured between opposed pairs of segments, either the "up-down" or "right-left" segments of the commutator 10, is indicative of the magnitude of displacement of the variable density plate 7 relative to the projected target image in the corresponding direction, while the relative polarity of this different potential is indicative of the direction of this displacement. This potential difference, or error signal, as it will be hereinafter referred to, is utilized to correct the displacement between the projected target image and the adapter plate by controlling movement of the motors 12 and 13.

Figure 2:
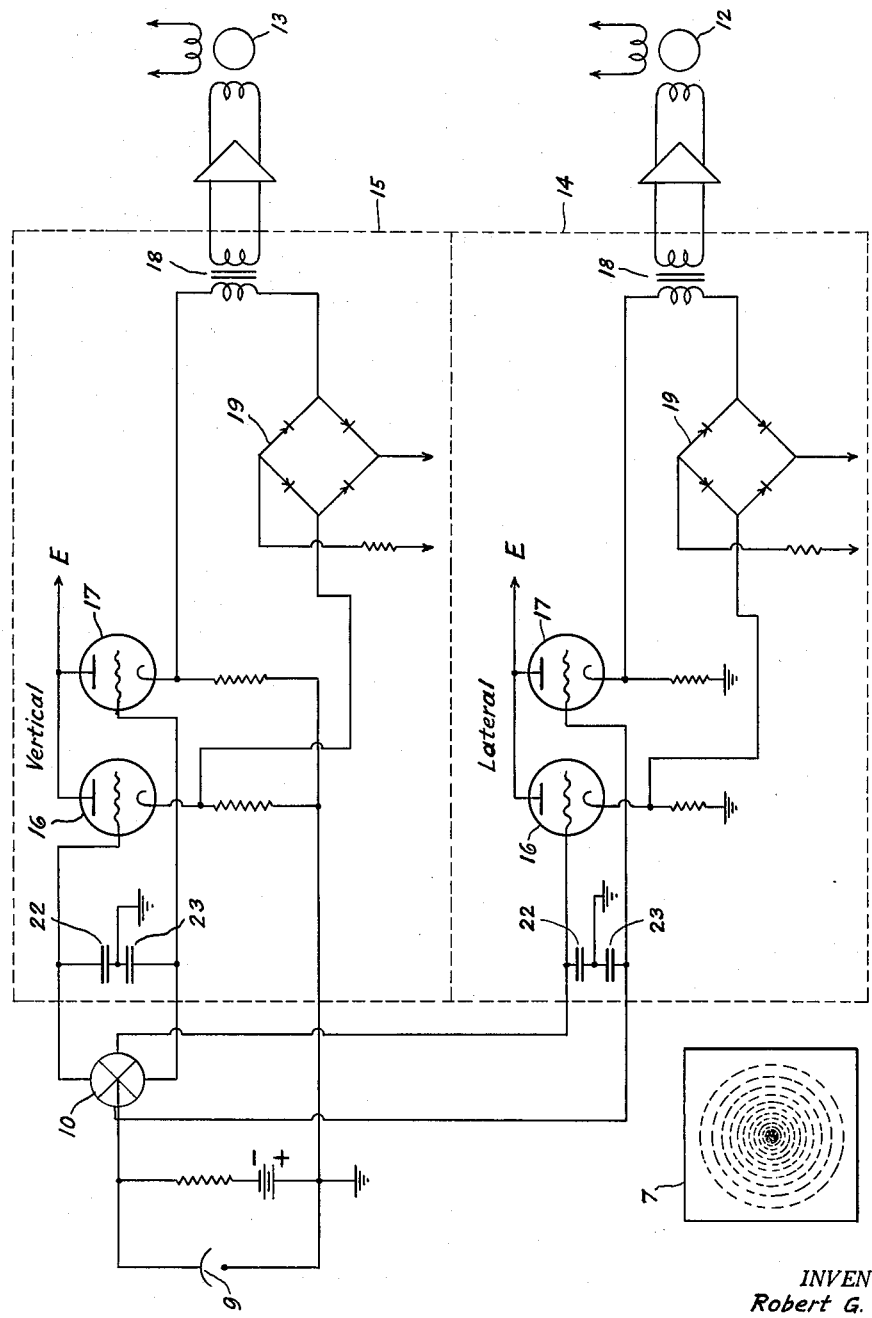
FIG. 2 is a wiring diagram of the error-producing and motor control circuits.
Figure 3:
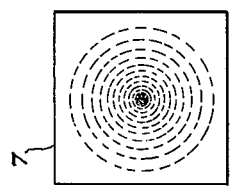
FIG. 3 is a plan view of the variable density plate.

Movement of the control motors 12 and 13 is derived from the error voltages developed across opposed segments of the commutator 10 by means of the motor control circuits 14 and 15 respectively, the circuits of which are shown schematically in FIG. 2. Because the motor control circuits 14 and 15 are identical in their operation, only control circuit 14 will be hereinafter described in detail.

Opposing segments of the commutator 10 are directly connected to the control grids of a pair of cathode follower tubes 16 and 17. Condensers 22 and 23 provide filtering for the pulsating signals derived from the commutator so that the grids of the tubes 16 and 17 are maintained at substantially D.C. potentials which change only with the light level falling on the photocell 9 during the portion of the circular scan of the image on the variable density plate 7 in which the corresponding commutator segment and grid is connected to the photocell.

Connecting the cathodes of the tubes 16 and 17 is the primary of a transformer 18 and a ring modulator circuit 19 in series. The ring modulator circuit 19 functions essentially as a switch permitting flow of current to the primary of the transformer 18 in proportion to the difference in potential on the cathodes of the tubes 16 and 17, the ring modulator interrupting this flow of current on alternate half cycles. The voltage signal across the secondary of the transformer 18 appears as an alternating voltage signal whose amplitude is proportional to the difference in potential of the cathodes of the tubes 16 and 17 and which is either in phase or 180° out of phase with the alternating voltage signal applied across the modulator, depending on the relative polarity of the cathode of the tubes 16 and 17.

The voltage signal on the secondary of the transformer 18 is amplified and applied to one phase of the two-phase motor 12. It will be evident that the speed of rotation of the motor 12 and its direction of rotation will be directly controlled by the voltage signal on the secondary of the transformer 18 and thus is a function of the error voltage derived across the opposing segments of the commutator 10. Actually, the amplitude of the voltage in the controlled phase, when the scanning circle does not pass through the densest point of the plate or is not entirely to one side of the center, is proportional to displacement of the average position of the image from the center of the variable density plate, so that for large displacements, the plate is moved rapidly while for small displacements, the motion is slower. Since the density of the plate varies uniformly from the center of the plate to the edge, the plate is centered by the motors 12 and 13 on the image at the same rate, regardless of where the image falls on the plate when the scanning circle is entirely to one side of the center of the plate.

Actual control of the path of flight of the aircraft in seeking and "homing" on the target is derived from the position of the variable density plate when matched to the target image. Information as to the position of the plate 7 is obtained specifically by means of variable resistors 20 and 21. The variable resistors are coupled with the movement of the plate 7 in such manner that the resistance varies directly as a function of the relative position of the plate 7. The positional information so derived is applied to the auto pilot (not shown).

From the above description, it will be appreciated that the objects of the invention have been achieved by the provision of a navigational control apparatus for use in guiding aircraft and the like and which is particularly adapted to control the flight of the aircraft from a single isolated reference point in such manner that the aircraft detects and seeks the position of the reference point.

While certain representative embodiments and details have been shown for the purpose of illustrating the invention, it will be apparent to those skilled in this art that various changes and modifications may be made therein without departing from the spirit or scope of the invention.

I claim:

1. An apparatus for guiding an aircraft toward an isolated target such as a ship at sea comprising radar means for indicating the position of the target relative to the aircraft, said radar means indicating the target image as a spot of light on the radar screen, a plate decreasing uniformly in density radially from its center, eccentrically mounted lens means between the radar screen and the plate for projecting the target image onto the plate, motor means associated with the lens means for eccentrically moving the lens means relative to the path of light therethrough whereby the projected target image scans through a small circle, a first motor associated with the plate for moving the plate laterally across the path of light of the projected image, a second motor associated with the plate for moving the plate in a direction perpendicular to said first motor but in the same plane, a photocell positioned behind the plate for measuring the light passing through the plate from the target image source, a four segment commutator rotated by the motor means synchronously with the scanning movement of the projected target image, motor control means connected to one pair of opposed segments of the commutator for controlling said first motor, motor control means connected to the other pair of opposed segments of the commutator for controlling said second motor, said motor control means being responsive to the difference in potential between opposed segments as determined by variations in light falling on the photocell as the projected image scans through a complete circle, said motors responding to said potential difference to move the plate in a direction so as to reduce the potential difference between opposed segments to zero, and two dimensional control means operatively associated with the plate for controlling the direction of flight of the aircraft in response to the movement and position of the plate.

2. An apparatus for guiding an aircraft toward an isolated target such as a ship at sea comprising radar means for indicating the position of the target relative to the aircraft, said radar means indicating the target image as a spot of light on the radar screen, a plate decreasing uniformly in density radially from its center, lens means between the radar screen and the plate for projecting the target image onto the plate, motor means associated with the lens means for eccentrically moving the lens means relative to the path of light therethrough whereby the projected target image scans through a small circle, a first motor associated with the plate for moving the plate laterally across the path of light of the projected image, a second motor associated with the plate for moving the plate in a direction perpendicular to said first motor but in the same plane, light responsive means positioned behind the plate for measuring the light passing through the plate from the target image source, a four segment commutator rotated by the motor means synchronously with the scanning movement of the projected target image, motor control means connected to one pair of opposed segments of the commutator for controlling said first motor, motor control means connected to the other pair of opposed segments of the commutator for controlling said second motor, said motor control means being responsive to the difference in potential between opposed segments as determined by variations in light falling on the light responsive means as the projected image scans through a complete circle, said motor responding to said potential difference to move the plate in a direction so as to reduce the potential difference between opposed segments to zero, and two dimensional control means operatively associated with the plate for controlling the direction of flight of the aircraft in response to the movement and position of the plate.

3. An apparatus for guiding an aircraft toward an isolated target such as a ship at sea comprising radar means for indicating the position of the target relative to the aircraft, said radar means indicating the target image as a spot of light on the radar screen, a plate decreasing uniformly in density radially from its center, lens means between the radar screen and the plate for projecting the target image onto the plate, motor means associated with the lens means for eccentrically moving the lens means relative to the path of light therethrough whereby the projected target image scans through a small circle, motors associated with the plate for moving the plate relative to the image, light responsive means positioned behind the plate for measuring the light passing through the plate from the target image source, a four segment commutator rotated by the motor means synchronously with the scanning movement of the projected target image, motor control means connected to one pair of opposed segments of the commutator for controlling said first motor, motor control means connected to the other pair of opposed segments of the commutator for controlling said second motor, said motor control means being responsive to the difference in potential between opposed segments as determined by variations in light falling on the light responsive means as the projected image scans through a complete circle, said motors responding to said potential difference to move the plate in a direction so as to reduce the potential difference between opposed segments to zero, and two dimensional control means operatively associated with the plate for controlling the direction of flight of the aircraft in response to the movement and position of the plate.

4. An apparatus for guiding an aircraft toward an isolated target such as a ship at sea comprising radar means for indicating the position of the target relative to the aircraft, said radar means indicating the target image as a spot of light on the radar screen, a plate decreasing uniformly in density radially from its center, lens means between the radar screen and the plate for projecting the target image onto the plate, motor means associated with the lens means for eccentrically moving the lens means relative to the path of light therethrough whereby the projected target image scans through a small circle, means associated with the plate for moving the plate relative to the image, light responsive means positioned behind the plate for measuring the light passing through the plate from the target image source, a four segment commutator rotated synchronously with the scanning movement of the projected target image, motor control means connected to opposed segments of the commutator for controlling the plate moving means, said motor control means being responsive to the difference in potential between opposed segments as determined by variations in light falling on the light responsive means as the projected image scans through a complete circle, said motors responding to said potential difference to move the plate in a direction so as to reduce the potential difference between opposed segments to zero, and two dimensional control means operatively associated with the plate for controlling the direction of flight of the aircraft in response to the movement and position of the plate.

5. An apparatus for determining amount and direction off course of an aircraft from a course toward an isolated target such as a ship at sea comprising radar means for indicating the position of the target relative to the aircraft, said radar means indicating the target image as a spot of light on the radar screen, a plate decreasing uniformly in density radially from its center, lens means between the radar screen and the plate for projecting the target image onto the plate, motor means associated with the lens means for eccentrically moving the lens means relative to the path of light therethrough whereby the projected target image scans through a small circle, means associated with the plate for moving the plate relative to the image, light responsive means positioned behind the plate for measuring the light passing through the plate from the target image source, a four segment commutator rotated synchronously with the scanning movement of the projected target image, and motor control means connected to opposed segments of the commutator for controlling the plate moving means, said motor control means being responsive to the difference in potential between opposed segments as determined by variations in light falling on the light responsive means as the projected image scans through a complete circle, said plate moving means responding to said potential difference to move the plate in a direction so as to reduce the potential difference between opposed segments to zero.

6. Navigational apparatus for aircraft and the like including means for producing a substantially instantaneous image of an isolated target, the image being substantially in the form of a spot of light on a dark background, said means indicating the relative position and movement of the aircraft and target, a plate comprising substantially an opaque spot near its center and gradually reducing radially in all directions from opaqueness to transparency, said plate and image being superimposed, means effecting a continuous nutating movement between the image and plate, light responsive means for indicating the variation in transmission of the image through the variable density plate, and means responsive to the variations in the output of the light responsive means for moving the plate "up-down" or "right-left" relative to the image to effect and maintain alignment of opaque spot the plate and light spot of the image as the target and image move relative to the aircraft.

7. In an apparatus for navigating aircraft and the like toward an isolated reference point, means carried by the aircraft for producing continuously an image of the reference point on a contrasting background, said means indicating the relative position and movement of the aircraft and reference point, a plate changing uniformly in density radially from a substantially central point, said plate being of opposite contrast to the image, said image and plate being superimposed, means associated with the plate responsive to the displacement error between the reference point of the image and the central point on the plate for effecting substantial match therebetween, and means responsive to the positioning of the plate in alignment with the image for controlling the flight path of the aircraft.

8. In an apparatus for navigating aircraft and the like toward an isolated target, radar means carried by the aircraft for producing continuously an image of the target, the image being substantially in the form of a spot of light on a dark background, said means indicating the relative position and movement of the aircraft and reference point, a plate comprising substantially an opaque spot near its center and gradually reducing radially in all directions from opaqueness to transparency, said image and plate being superimposed, means continuously nutating the spot of light of the image with respect to the opaque spot of the plate, means associated with the plate responsive to the displacement error between the spot of light of the image and the opaque spot on the plate for effecting movement of the plate in two directions and substantial match between the spots therebetween, and means responsive to the positioning of the spots in alignment for controlling the flight path of the aircraft.

9. Navigational apparatus for aircraft and the like including means for producing a substantially instantaneous image of an isolated target, said means indicating the relative position and movement of the aircraft and target, a plate decreasing in density substantially uniformly in all radial directions from a substantially opaque center, lens means for superimposing the plate and image, means for eccentrically moving the lens means to effect a scanning movement between the image and plate, light responsive means for indicating the variation in transmission of the image through the variable density plate, means responsive to the variations in the output of the light responsive means for moving the plate relative to the image to effect and maintain alignment of the plate and image as the target and image move relative to the aircraft, and means responsive to the movement and position of the plate in maintaining alignment with the target for controlling the flight of the aircraft.

10. Navigational apparatus for aircraft and the like including means for producing a substantially instantaneous image of an isolated target, said means indicating the relative position and movement of the aircraft and the target, a plate decreasing in density substantially uniformly in all radial directions from a substantially opaque center, said plate and image being superimposed, means effecting a scanning movement between the image and plate, light responsive means for indicating the variation in transmission of the image through the variable density plate, means responsive to the variations in the output of the light responsive means for moving the plate relative to the image to effect and maintain alignment of the plate and image as the target and image move relative to the aircraft, and means responsive to the movement and position of the plate in maintaining alignment with the target for controlling the flight of the aircraft.

References Cited by the Examiner

UNITED STATES PATENTS

| | | | |
|---|---|---|---|
| 2,204,553 | 6/1940 | Smola | 250—204 X |
| 2,378,526 | 6/1945 | Agnew | 250—237 X |
| 2,403,387 | 7/1946 | McLennan | 250—203 |
| 2,421,085 | 5/1947 | Rylsky | 102—50 X |
| 2,431,510 | 11/1947 | Salinger | 250—236 X |
| 2,463,362 | 3/1949 | Doll | 250—203 X |
| 2,474,828 | 7/1949 | Connelly | 250—237 |
| 2,486,334 | 10/1949 | Slamar | 250—219 |
| 2,518,694 | 8/1950 | Jannopoulo | 343—7 X |
| 2,526,682 | 10/1950 | Mulberger | 343—9 |
| 2,563,892 | 8/1951 | Waller et al. | 250—204 X |

FOREIGN PATENTS

| | | |
|---|---|---|
| 352,035 | 6/1931 | Great Britain. |
| 33,746 | 9/1934 | Netherlands. |

BENJAMIN A. BORCHELT, *Primary Examiner.*

NORMAN H. EVANS, JAMES L. BREWRINK,
*Examiners.*